April 14, 1942.  H. H. McGEE  2,279,834
VALVE
Filed April 14, 1941

INVENTOR.
HOWARD H. McGEE.
BY Benj. T. Rauber ATTORNEY

Patented Apr. 14, 1942

2,279,834

UNITED STATES PATENT OFFICE 2,279,834

VALVE

Howard H. McGee, New York, N. Y.

Application April 14, 1941, Serial No. 388,402

7 Claims. (Cl. 251—9)

My invention relates to a fluid valve but more particularly to a valve for use with fountain syringes and similar apparatus.

In apparatus of the above type it is necessary at times to interrupt the flow of fluid through a tube of rubber, or other similar material, and desirable to provide for this purpose a valve mechanism which is readily manipulated and that is entirely contained within the tubular conduit and which, therefore, has no removable parts that require packing.

Also it is desirable to have a valve of simple construction which may be set and which will remain in either closed or open position and which does not involve any distortion or clamping of the rubber tube itself.

This is accomplished in my present invention which provides a valve for apparatus of the above type having a swinging connection that, when tilted in one position, establishes an open passage for the flow of fluid and, when tilted to another position closes the passage.

Figure 1:
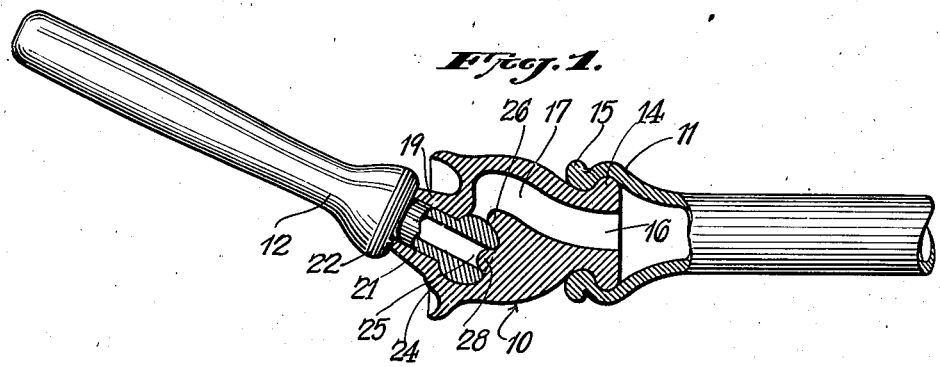
Figure 2:
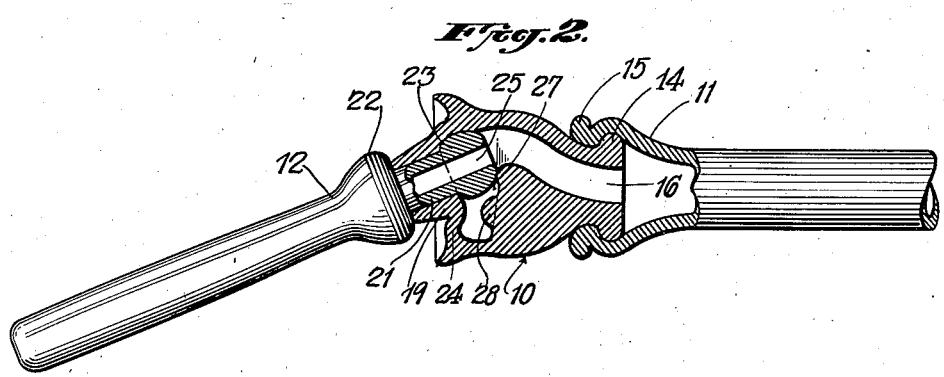
Figure 4:
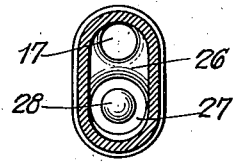
Figure 3:
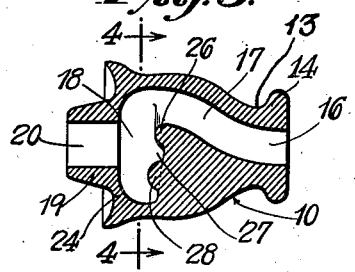
Figure 5:
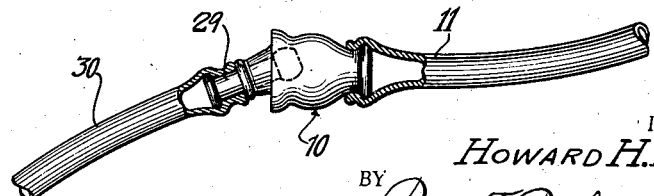

Various features of my invention are illustrated, by way of example, in the accompanying drawing in which Fig. 1 is a longitudinal section through a valve embodying a preferred form of my invention and showing the parts in closed position. Fig. 2 is a similar view showing the parts in open position. Fig. 3 is a longitudinal section of the valve chamber. Fig. 4 is a cross-section taken on the line 4—4 of Fig. 3, and Fig. 5 is a view similar to that of Fig. 2 showing the invention as applied to a different connector from that of Figs. 1 and 2.

In the embodiment of my invention shown in Figs. 1 and 2, a closure or shut-off valve 10 is illustrated as connecting a rubber tube 11 to a nozzle 12. The valve 10 may be of any suitable material but is preferably of vulcanized rubber and therefore resilient.

At one end the valve is narrowed to a neck 13 terminating at an enlargement or bead 14 over which the end 15 of the tube 11 is passed to grip onto the neck portion 13. A passage 16 extends from the end of the valve through the neck portion 13 being deflected sidewise as at 17 and terminating in a valve chamber 18 which extends transversely to the length of the valve chamber and to the general direction of the fluid passage.

The valve chamber is widened as shown in Figs. 3 and 4 in accordance with the transverse dimension of the valve chamber. The valve has an extension 19 beyond the valve chamber 18 and an opening 20 extending through this extension into the valve chamber.

A neck portion 21 of the nozzle 12 extends through the opening 20 and forms a fluidtight connection therewith. The nozzle 12 has an enlargement or shoulder 22 which abuts against the end of the extension 19 and the inner end of the nozzle 12 is enlarged as at 23 to engage the inner end of the opening 20, the neck 21 being of such length as to bring the shoulder 22 and enlarged end 23 tightly against the ends of the opening 20 and to hold the nozzle firmly in the opening 20.

The material of the valve being flexible or resilient, such as rubber, permits extension 19 to be distorted and the nozzle 12 to be tilted from the position shown in Fig. 1 to that shown in Fig. 2 and reversely. For this purpose the wall of the valve may be made thinner about the base of the extension or projection 19 as indicated at 24. This enables the projection 19 and the nozzle 12 to spring slightly outwardly.

When the nozzle is tilted to the position shown in Fig. 2, a central passage 25 of the nozzle communicates with the end of the passage 17 so that the fluid may flow freely through this passage into and through the nozzle. In this position the enlarged end 23 of the nozzle may abut tightly against the surface of the passage 17 which will in that sense act as an open valve seat for the end of the nozzle. The nozzle is held in this position by an annular ridge 26 immediately adjacent the passage 17 and forming one wall of the chamber 18. When the nozzle 12 is tilted to the position shown in Fig. 1 the enlarged end 23 of the nozzle overrides the edge of the annular ridge 26 by distorting or stretching the thin wall portion 24 until it clears the ridge and then snaps back into an annular groove 27 formed within the ridge and about a central boss 28 which fits into the end of the passage 25 of the nozzle 12. There is, therefore, a close contact between the central boss 28 and the inner surface of the passage 25, the bottom of the groove 27 and the end of the nozzle and the ridge 26 and the outer surface of the enlargement 23, thus forming a secure watertight or fluidtight shut-off or closure between the nozzle 12 and the passage 17.

Inasmuch as the inner end of the nozzle is compressed tightly into the groove 27, it is held firmly closed against displacement until sufficient bending pressure is applied to overcome the tension of the walls of the valve and to snap the nozzle to the open position shown in Fig. 2.

In the embodiment of the invention shown in Fig. 5 the valve is the same as in Fig. 1 but instead of the valve being opened and closed by the nozzle 12, a connecting or joint member 29 is substituted for the nozzle 12. This may be used to connect one length of tubing 11 to a second length 30.

Through the above invention I provide a closure valve in which the moving parts of the valve are entirely contained within the valve structure, in which the valve may be set by a bending pressure in either open or closed position and will remain in that position until sufficient bending pressure is applied to overcome the holding tension of the valve structure. It will be apparent, of course, that the valve need not be made entirely of resilient rubber, although this is preferred, it only being necessary that there be a part engaging the nozzle 12, connector 29 or other element, in such manner as to permit it to tilt and to draw it tightly into the groove 27 or into the end of the passage 17 when tilted to one position or the other.

What I claim is:

1. A fluid control valve comprising a flexible walled chamber having a closed valve seat and a passage from said chamber and a tube entering said chamber through a flexible wall thereof and tiltable by flexing said wall to a tight contact with said closed seat and aside from said closed seat into communication with said passage.

2. A fluid control valve comprising a chamber having a closed valve seat and a passage entering said chamber and forming an open valve seat therewith and a tube entering said chamber through a flexible wall thereof to enable it to tilt to bring the inner end of said tube into closing contact with said closed valve seat or into communication with said passage.

3. The valve of claim 2 in which said closed valve seat has an annular groove to receive the end of said tube.

4. A fluid control valve comprising a chamber and a passage entering said chamber and forming an annular seat therewith, an annular ridge at one side of said passage and a boss within said ridge to form an annular groove therein and a tube entering said chamber opposite said passage, said annular ridge and groove, and having its inner end seating in said groove, said tube being resiliently mounted to permit said inner end to swing out of said groove and onto the seat formed by said passage.

5. The valve of claim 4 in which said tube has an enlarged end within said valve chamber, a neck extending through the wall of said valve chamber and a shoulder outside of said valve to grip said tube firmly in said valve chamber.

6. The valve of claim 4 in which said wall of said valve chamber about the neck portion of said tube is of a reduced thickness to permit said tube to tilt and to pass over said ridge under tension.

7. A fluid control valve comprising a flexible walled chamber having a closed valve seat and a passage from said chamber and a ridge between said closed valve seat and said passage and a tube entering said chamber through a flexible wall thereof and tiltable by flexing said wall to a tight contact with said closed seat on one side of said ridge and over said ridge to communicate with said passage, said flexible wall yielding to permit passage of said end of said tube over said ridge.

HOWARD H. McGEE.